US010649359B2

(12) United States Patent
Shiraishi

(10) Patent No.: US 10,649,359 B2
(45) Date of Patent: May 12, 2020

(54) LENS MIRROR ARRAY AND IMAGE FORMING APPARATUS USING THE SAME

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/270,520

(22) Filed: Feb. 7, 2019

(65) Prior Publication Data
US 2019/0354035 A1 Nov. 21, 2019

(30) Foreign Application Priority Data

May 18, 2018 (JP) .................. 2018-096456

(51) Int. Cl.
*G03G 15/04* (2006.01)
*G02B 3/00* (2006.01)
*G02B 17/00* (2006.01)

(52) U.S. Cl.
CPC ..... *G03G 15/04036* (2013.01); *G02B 3/0006* (2013.01); *G02B 17/002* (2013.01)

(58) Field of Classification Search
CPC ....... G03G 15/04036; G03G 15/04045; G03G 15/0409; G02B 3/00; G02B 3/0006; G02B 17/002; G02B 17/006; G02B 17/086
See application file for complete search history.

(56) References Cited

U.S. PATENT DOCUMENTS

2016/0216634 A1 7/2016 Shiraishi
2016/0216635 A1* 7/2016 Shiraishi ............ G03G 15/0409
2017/0351194 A1 12/2017 Shiraishi

FOREIGN PATENT DOCUMENTS

JP 2011-027922 A 2/2011

OTHER PUBLICATIONS

JP 2011-027922 (published on Feb. 10, 2011) machine translation printed on Sep. 4, 2019.*

* cited by examiner

*Primary Examiner* — Sophia S Chen
(74) *Attorney, Agent, or Firm* — Kim & Stewart LLP

(57) ABSTRACT

A lens mirror array includes a plurality of optical elements connected to each other and aligned along one direction. Each of the optical elements comprises a first lens surface on which light is incident, a first reflection surface on which the incident light is reflected within the optical element, a second reflection surface on which the reflected light is further reflected within the optical element, a second lens surface through which the light reflected by the second reflection surface is emitted outside the optical element, and a protruding portion having a plurality of surfaces and connected to the first lens surface and the second reflection surface. One of the surfaces of the protruding portion inclined with respect to a direction of light incident on the protruding portion has a prism structure.

18 Claims, 10 Drawing Sheets

US 10,649,359 B2

LENS MIRROR ARRAY AND IMAGE FORMING APPARATUS USING THE SAME

CROSS-REFERENCE TO RELATED APPLICATION

This application is based upon and claims the benefit of priority from Japanese Patent Application No. 2018-096456, filed May 18, 2018, the entire contents of which are incorporated herein by reference.

FIELD

Embodiments described herein relate generally to a lens mirror array incorporated in a document reading device such as a copy machine, a multi-functional peripheral, a printer, a scanner and the like or an exposure device, and an image forming apparatus using the same.

BACKGROUND

In recent years, a solid-state scanning type LED (Light Emitting Diode) copy machine having an exposure optical system using a semiconductor light emitting element as a light source has been widely used. The exposure device, which forms an electrostatic latent image on a surface of a photoconductive drum of the LED copy machine, has a lens mirror array that refracts and reflects light based on an image signal incident from the light source to converge it on the surface of the photoconductive drum. For example, the lens mirror array has a plurality of optical elements for converging light from the plurality of light sources arranged in a main scanning direction on the surface of the photoconductive drum. The lens mirror array is made of, for example, a transparent resin, and has a structure in which the plurality of optical elements is integrally connected to each other in the main scanning direction. A light shielding material for cutting out noise light unnecessary for exposure (for example, light undesirably incident on an adjacent optical element) is applied to a surface of each optical element.

In addition, a lens array element in which a prism structure is arranged around a lens on a light emitting surface on which the lens is formed is provided as a module for cutting out the noise light included in the light incident on the lens. The prism structure reflects the noise light according to a retroreflection principle.

DETAILED DESCRIPTION

In accordance with an embodiment, a lens mirror array comprises a plurality of optical elements connected to each other and aligned along one direction. Each of the optical elements comprises a first lens surface on which light is incident, a first reflection surface on which the incident light is reflected within the optical element, a second reflection surface on which the reflected light is further reflected within the optical element, a second lens surface through which the light reflected by the second reflection surface is emitted outside the optical element, and a protruding portion having a plurality of surfaces and connected to the first lens surface and the second reflection surface. One of the surfaces of the protruding portion inclined with respect to a direction of light incident on the protruding portion has a prism structure.

Hereinafter, embodiments are described with reference to the accompanying drawings.

Figure 1:
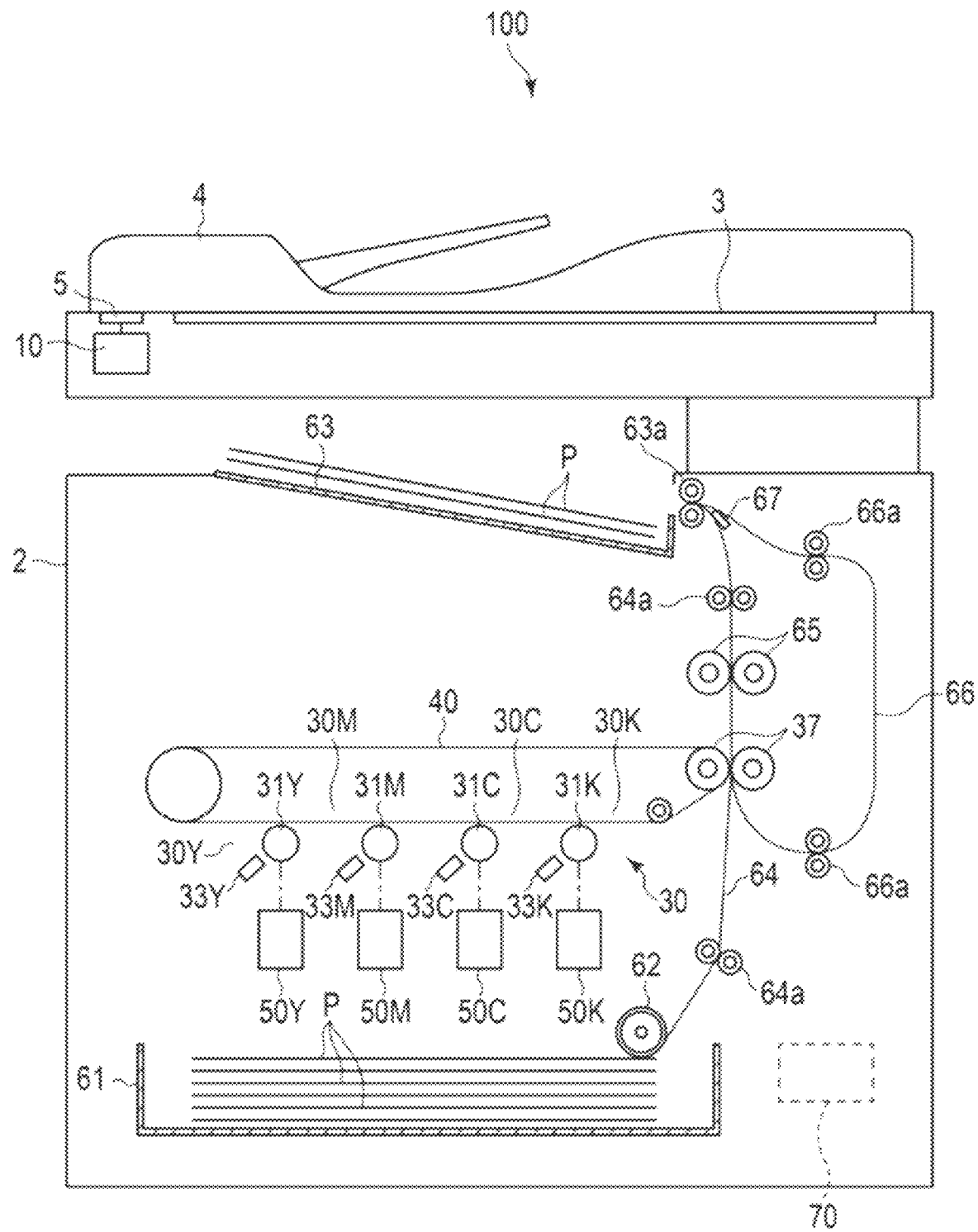
FIG. 1 is a schematic diagram illustrating a copy machine according to an embodiment.

FIG. 1 is a schematic diagram illustrating a copy machine 100 which is an example of an image forming apparatus. The copy machine 100 is, for example, a solid-state scanning type LED copy machine having an exposure optical system in which a semiconductor light emitting element such as an LED is used as a light source.

The copy machine 100 has a housing 2. A transparent document table glass 3 on which a document is set is arranged on an upper surface of the housing 2. On the document table glass 3, an ADF (Automatic Document Feeder) 4 is provided. The ADF 4 is provided in an openable manner on the document table glass 3. The ADF 4 functions as a document presser for pressing the document placed on the document table glass 3, and also has a function of feeding the document through a document reading position (reading glass 5) described later.

Figure 2:
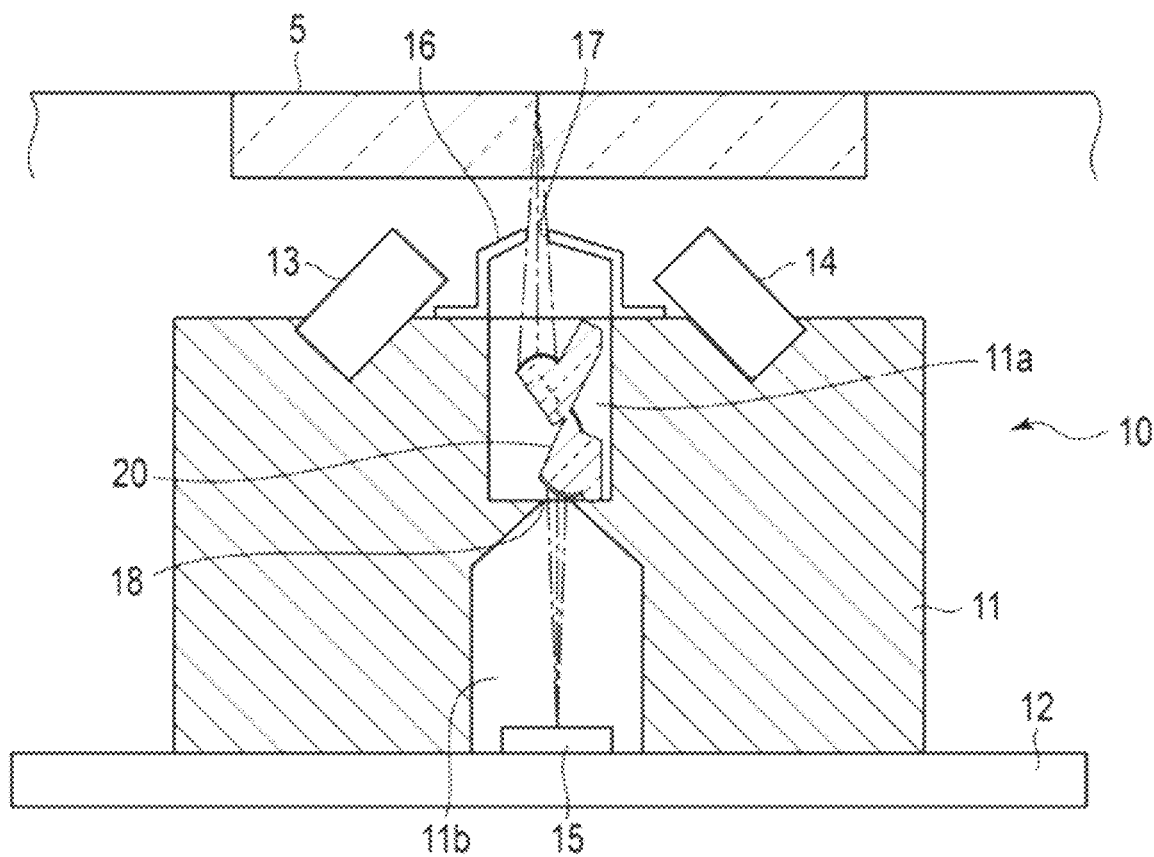
FIG. 2 is a schematic diagram illustrating a document reading device incorporated in the copy machine in FIG. 1.

A document reading device 10 is provided below the document table glass 3. FIG. 2 is a schematic diagram illustrating the document reading device 10. The document reading device 10 can be moved in a lateral direction (i.e., sub-scanning direction) in FIG. 1 along the document table glass 3 by a driving mechanism (not shown), or may be fixed at a position below the transparent reading glass 5 (position shown in FIG. 1) to flush with the document table glass 3.

As shown in FIG. 2, the document reading device 10 has a support body 11 having a rectangular block shape. The support body 11 extends in a direction orthogonal to a paper surface parallel to a rotation axis of a photoconductive drum (i.e., main scanning direction) described later. The support body 11 is arranged on a substrate 12. The substrate 12 extends horizontally in the main scanning direction. The substrate 12 and the support body 11 are movable in the sub-scanning direction along the document table glass 3.

Two illuminating devices 13 and 14 are provided on an upper surface of the support body 11 on the document table glass 3 side (i.e., on the reading glass 5 side). The illuminating devices 13 and 14 extend in the main scanning direction, and are separated from each other in the lateral direction (i.e., sub-scanning direction) in FIG. 2. The illuminating devices 13 and 14 move in the sub-scanning direction together with the support body 11 to irradiate the document placed on the document table glass 3 and a document fed along the reading glass 5 via the reading glass 5. The illuminating devices 13 and 14 are attached to the support body 11 in a posture in which the light emitted therefrom is inclined towards a document reading area.

The illuminating devices 13 and 14 each have a light source in which a plurality of LED elements (not shown) is arranged in the main scanning direction, and include a light guide (not shown) extending in the main scanning direction. Besides this, each of the illuminating devices 13 and 14 may be a fluorescent tube, a xenon tube, a cold cathode ray tube, an organic EL (Electro-Luminescence), or the like.

Figure 3:
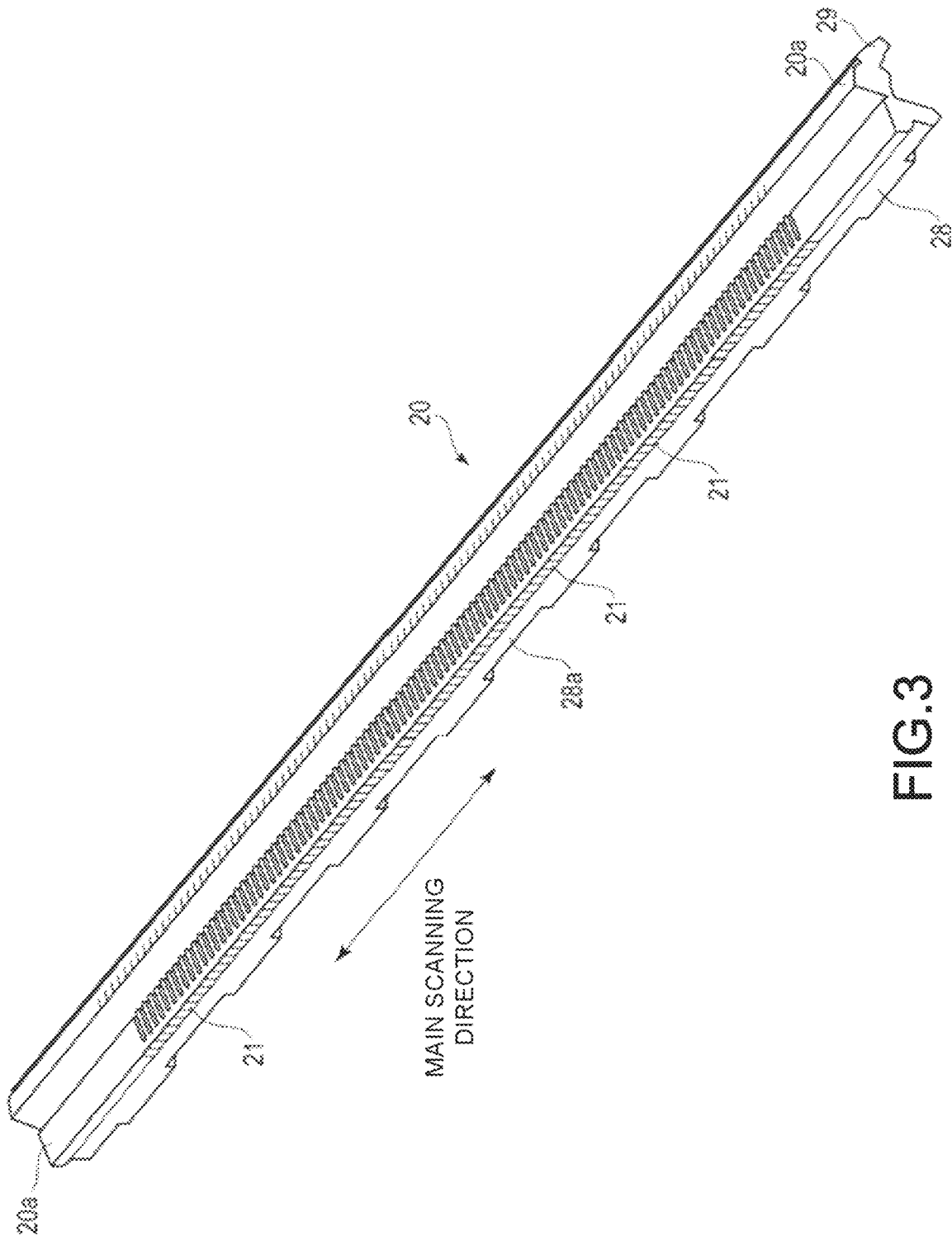
FIG. 3 is an external perspective view illustrating a lens mirror array incorporated in a document reading device in FIG. 2.

The support body 11 supports a lens mirror array 20 near an upper surface thereof and between the two illuminating devices 13 and 14 described above. FIG. 3 is a perspective view illustrating an external appearance of the lens mirror array 20. The lens mirror array 20 extends in the main scanning direction and has a function of forming an erected image of the document on an image sensor 15 mounted on a substrate 12. The lens mirror array 20 is described in detail later.

The image sensor 15 is a line sensor in which a plurality of image capturing elements for converting light to electrical signals (image signals) is arranged in a line. One or more image sensors 15 may be provided. The plurality of image capturing elements of the image sensor 15 is arranged side by side in the main scanning direction. The image sensor 15 is constituted by, for example, a CCD (Charge Coupled Device), a CMOS (Complementary Metal Oxide Semiconductor), or other image capturing elements.

A light shielding material 16 is attached to the upper surface of the support body 11. The light shielding material 16 has a slit 17 extending in the main scanning direction to guide reflected light from the document to the lens mirror array 20. The light shielding material 16 has a structure in which an elongated rectangular plate is bent along a longitudinal direction thereof, and a light shielding material is applied on the surface thereof. The slit 17 of the light shielding material 16 has a function of preventing light other than the reflected light from a predetermined range of the document from being incident on the lens mirror array 20.

The support body 11 has a slit 18 extending in the main scanning direction on the image sensor 15 side with respect to the lens mirror array 20. The support body 11 has a chamber 11a accommodating the lens mirror array 20 and a chamber 11b accommodating the image sensor 15, and the slit 18 is provided between the chambers 11a and 11b. The slit 18 has a width at which the reflected light from the document among the light emitted from the lens mirror array 20 can pass through, and shields unnecessary light which becomes a noise component (i.e., noise light) with the edge of the slit 18.

For example, if the document is fed by the ADF 4 in a state in which the document reading device 10 is fixed under the reading glass 5 (a state shown in FIG. 1 and FIG. 2), the document is irradiated via the reading glass 5 by the illuminating devices 13 and 14. The reflected light from the document is incident on the lens mirror array 20 via the slit 17 of the light shielding material 16. The lens mirror array 20 reflects the reflected light from the document as described later to converge the light, and emits the light towards the image sensor 15 via the slit 18. The image sensor 15 receives the reflected light from the document and performs photoelectric conversion on the reflected light to output an image signal.

At this time, an erected image formed on the image sensor 15 by the lens mirror array 20 of the document passing over the reading glass 5 by the operation of the ADF 4 is read line by line along the main scanning direction. Then, as the document passes over the reading glass 5 in the sub-scanning direction, it is possible to acquire an image of the entire document (plural lines). Similarly, when the document reading device 10 is moved in the sub-scanning direction along the document table glass 3 after the document is set on the document table glass 3, the lens mirror array 20 can also acquire the image of the entire document by reading the erected image of the document formed on the image sensor 15 by the lens mirror array 20 line by line along the main scanning direction.

The copy machine 100 has an image forming unit 30 substantially at the center of the inside of the housing 2. The image forming unit 30 has a yellow image forming unit 30Y, a magenta image forming unit 30M, a cyan image forming unit 30C and a black image forming unit 30K along a traveling direction of an intermediate transfer belt 40. Since the image forming units 30Y, 30M, 30C and 30K for respective colors have substantially the same structure, here, the black image forming unit 30K is described as a representative, and the detailed description for the image forming units 30Y, 30M and 30C for the other colors is omitted.

Figure 4:
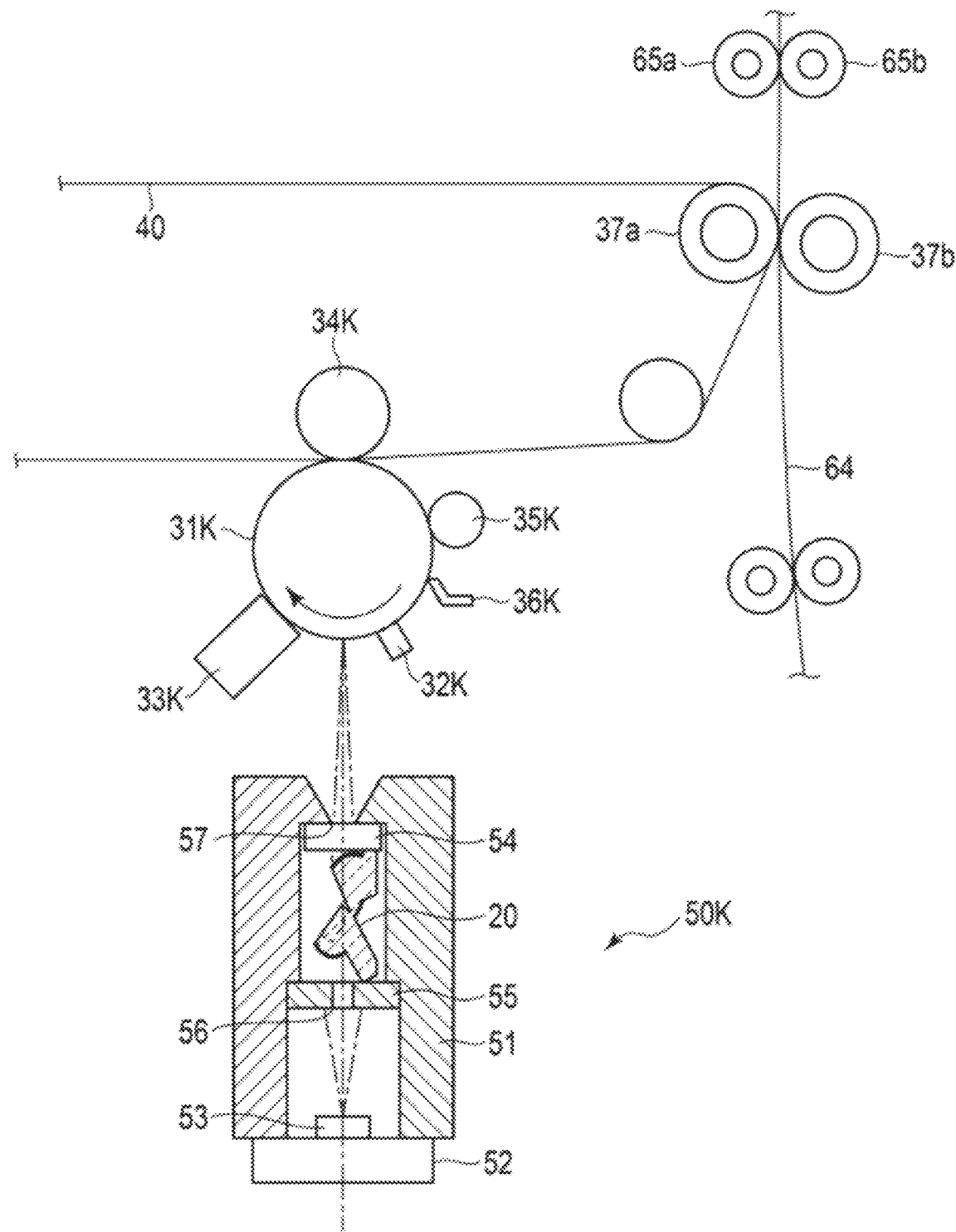
FIG. 4 is a schematic diagram illustrating an exposure device and a surrounding structure thereof of an image forming unit incorporated in the copy machine in FIG. 1.

FIG. 4 is a schematic diagram illustrating the black image forming unit 30K and a surrounding structure thereof in an enlarged manner. The black image forming unit 30K has, for example, a photoconductive drum 31K (photoreceptor), an electrostatic charger 32K, an exposure device 50K, a black developing device 33K, a primary transfer roller 34K, a cleaner 35K and a blade 36K. A similar structure exists for the cyan image forming unit 30C that has a cyan developing device 33C, the magenta image forming unit 30M that has a magenta developing device 33M, and the yellow image forming unit 30Y that has a yellow developing device 33Y, in which those structures are not shown in FIG. 4 for reasons of brevity.

The photoconductive drum 31K has a rotation axis extending in the main scanning direction, and an outer circumferential surface thereof contacts a surface of the intermediate transfer belt 40 to become rotatable. The primary transfer roller 34K is provided at the inside of the intermediate transfer belt 40 to face the photoconductive drum 31K. The photoconductive drum 31K is rotated in a direction indicated by an arrow (i.e., clockwise direction) at the same peripheral speed as the intermediate transfer belt 40 by a driving mechanism (not shown).

The electrostatic charger 32K uniformly charges the surface of the photoconductive drum 31K. The exposure device 50K irradiates the surface of the photoconductive drum 31K with exposure light based on an image signal for black after color separation to form an electrostatic latent image based on the image signal for black on the surface of the photoconductive drum 31K. The developing device 33K supplies black toner to the electrostatic latent image formed on the surface of the photoconductive drum 31K to form a black toner image on the surface of the photoconductive drum 31K.

The primary transfer roller 34K transfers the black toner image formed on the surface of the photoconductive drum 31K onto the intermediate transfer belt 40 by superimposing it on toner images for the other colors. The cleaner 35K and the blade 36K remove the toner left on the surface of the photoconductive drum 31K. The toner images for respective colors transferred onto the surface of the intermediate transfer belt 40 in a superimposed manner are conveyed to a space between a pair of secondary transfer rollers 37a and 37b (hereinafter, collectively referred to as a transfer roller pair 37) by the traveling of the intermediate transfer belt 40.

As shown in FIG. 4, the exposure device 50K has a support body 51 having a rectangular block shape. The support body 51 extends in the main scanning direction orthogonal to the paper surface parallel to the rotation axis of the photoconductive drum 31K, and is arranged below the photoconductive drum 31K shown in FIG. 4 to face the photoconductive drum 31K in a separated manner.

The support body 51 supports the lens mirror array 20 having the same structure as the lens mirror array 20 of the document reading device 10 described above in such a manner that the top and bottom of the lens mirror array 20 are reversed. The lens mirror array 20 extending in the main scanning direction reflects the incident light from a light source 53 to converge the light as described later, and emits it towards the surface of the photoconductive drum 31K. The light source 53 is formed by arranging a plurality of light emitting elements (not shown) on the surface of a substrate 52 in a line shape in the main scanning direction. The light source 53 is provided in one line or in a plurality of lines. The lens mirror array 20 is described in detail later.

The light source 53 emits the light based on image data (image signal) for black obtained by performing color separation on image data acquired by the document reading device 10 or image data acquired via an external device such as a personal computer (not shown). The plurality of light emitting elements of the light source 53 is, for example, LEDs or OLEDs (Organic Light Emitting Diodes) that is turned on or turned off based on the image data.

The support body 51 supports a transparent protective glass 54 on the photoconductive drum 31K side with respect to the lens mirror array 20. The protective glass 54 is to prevent adhesion of toner, dust or the like to the lens mirror array 20. The protective glass 54 is positioned by abutting against one end of the lens mirror array 20. The support body 51 supports a light shielding body 55 on the light source 53 side with respect to the lens mirror array 20. The light shielding body 55 has a slit 56 extending in the main scanning direction, and for example, a light shielding material is applied on the surface thereof. The light shielding body 55 shields a part of the light emitted from the light source 53.

The support body 51 has a slit 57 extending in the main scanning direction on a light emitting side of the protective glass 54. The slit 57 has a width at which a light component necessary for exposure can pass through, and shields noise light unnecessary for exposure using the edge of the slit 57.

The light emitted from the light source 53 passes through the slit 56 of the light shielding body 55 to be incident on the lens mirror array 20. The lens mirror array 20 reflects the light from the light source 53 and converges the light to emit the light. The light emitted from the lens mirror array 20 is converged on the surface of the rotating photoconductive drum 31K via the protective glass 54 and the slit 57.

At this time, due to the rotation of the photoconductive drum 31K, an electrostatic latent image is written line by line on the surface of the photoconductive drum 31K along the main scanning direction. When the photoconductive drum 31K rotates by a certain amount, an electrostatic latent image for black after color separation for the entire image of the document is formed on the surface of the photoconductive drum 31K.

As shown in FIG. 1, the copy machine 100 has the transfer roller pair 37 for transferring toner images for respective colors, which are transferred onto the surface of the intermediate transfer belt 40 in a superimposed manner, onto a sheet P. As shown in FIG. 4, one transfer roller 37a is arranged at the inside of the intermediate transfer belt 40, and the intermediate transfer belt 40 is wrapped around it. The other transfer roller 37b faces the one transfer rollers 37a across the intermediate transfer belt 40. The toner images for respective colors transferred onto the surface of the intermediate transfer belt 40 in a superimposed manner are fed to a nip of the transfer roller pair 37 by the traveling of the intermediate transfer belt 40.

On the other hand, in the vicinity of a lower end in the housing 2 of the copy machine 100, a sheet feed cassette 61 accommodating a plurality of sheets P of a predetermined size in a superimposed manner is provided. For example, the sheet feed cassette 61 is capable of being drawn out from the front surface of the housing 2 and accommodated inside the housing 2. Above a right end of the sheet feed cassette 61 in FIG. 1, a pickup roller 62 is arranged for picking up the uppermost sheet P in a superimposed direction of the sheets P accommodated in the sheet feed cassette 61. The pickup roller rotates while a circumferential surface thereof contacts the sheet P to pick up the sheets P one by one.

A sheet discharge tray 63 is provided at the upper part of the housing 2. The sheet discharge tray 63 is arranged below the document table glass 3, and the sheet P on which an image is formed is discharged to the sheet discharge tray 63 from the inside of the copy machine 100. Between the pickup roller 62 and the sheet discharge tray 63, a conveyance path 64 is provided for conveying the sheet P taken out from the sheet feed cassette 61 towards the sheet discharge tray 63 in a vertical direction. The conveyance path 64 extends through the nip of the transfer roller pair 37, and a plurality of conveyance roller pairs 64a and a conveyance guide (not shown) are arranged along the path. The conveyance roller pair 65 as shown in FIG. 1 is shown in FIG. 4 by way of rollers 65a, 65b. A sheet discharge roller pair 63a for discharging the sheet P to the sheet discharge tray 63 is provided at an end of the conveyance path 64. The sheet discharge roller pair 63a can rotate in both forward and reverse directions.

A fixing roller pair 65 is arranged on the conveyance path 64 on the downstream side of the transfer roller pair 37 (i.e., upper side in FIG. 1). The fixing roller pair 65 heats and pressurizes the sheet P conveyed via the conveyance path 64 to fix the toner image transferred onto the surface of the sheet P to the surface of the sheet P.

The copy machine 100 has a reverse conveyance path 66 for reversing front and back surfaces of the sheet P on which an image is formed on one surface thereof to feed the sheet P to the nip of the transfer roller pair 37. A plurality of conveyance roller pairs 66a rotating to convey the sheet P by sandwiching the sheet P and a conveyance guide (not shown) are arranged along the reverse conveyance path 66. On the upstream side of the sheet discharge roller pair 63a, a gate 67 is provided for switching a destination of the sheet P between the conveyance path 64 and the reverse conveyance path 66.

After the pickup roller 62 is rotated to take out the sheet P from the sheet feed cassette 61, the sheet P is conveyed to the sheet discharge tray 63 via the conveyance path 64 by the plurality of conveyance roller pairs 64a. At this time, toner images for respective colors transferred onto the surface of the intermediate transfer belt 40 are fed to the nip of the transfer roller pair 37 in accordance with a conveyance timing of the sheet P, and the toner images for the respective colors are transferred onto the surface of the sheet P by a transfer voltage applied from the transfer roller pair 37.

The sheet P onto which the toner image is transferred is heated and pressurized when passing through the fixing roller pair 65, and the toner image is melted and pressed against the surface of the sheet P, thereby fixing the toner image to the sheet P. The sheet P on which an image is formed in this way is discharged to the sheet discharge tray 63 via the sheet discharge roller pair 63a.

At this time, if a duplex mode in which an image is also formed on the back surface of the sheet P is selected, at a timing immediately before a rear end in a discharge direction of the sheet P being discharged towards the sheet discharge tray 63 leaves the nip of the sheet discharge roller pair 63a, the gate 67 switches the destination of the sheet P to the reverse conveyance path 66 and the sheet discharge roller pair 63a is reversely rotated, thereby switching back the sheet P. As a result, the rear end of the sheet P is directed to the reverse conveyance path 66, and the sheet P whose front and back surfaces are reversed is conveyed to the nip of the transfer roller pair 37.

Then, a toner image based on the image data to be formed on the back surface of the sheet P is formed on the surface of the intermediate transfer belt 40. Due to the traveling of the intermediate transfer belt 40 holding the toner images for respective colors, the toner images of the respective colors are conveyed to the nip of the transfer roller pair 37. Then, the toner image is transferred onto the back surface of the reversed sheet P to be fixed, and then the sheet is discharged to the sheet discharge tray 63 by the sheet discharge roller pair 63a.

The copy machine 100 has a controller 70 for controlling each mechanism described above. The controller 70 includes a processor such as a CPU (Central Processing Unit) and a memory. The controller 70 performs various processing functions by executing programs stored in the memory by the processor. The controller 70 acquires an image from the document by controlling the document reading device 10. The controller 70 forms an image on the surface of the sheet P by controlling the image forming unit 30. For example, the controller 70 inputs the image data read by the document reading device 10 to the image forming unit 30. The controller 70 controls a plurality of conveyance roller pairs 64a and 66a to convey the sheet P via the conveyance path 64 and the reverse conveyance path 66.

Figure 5:
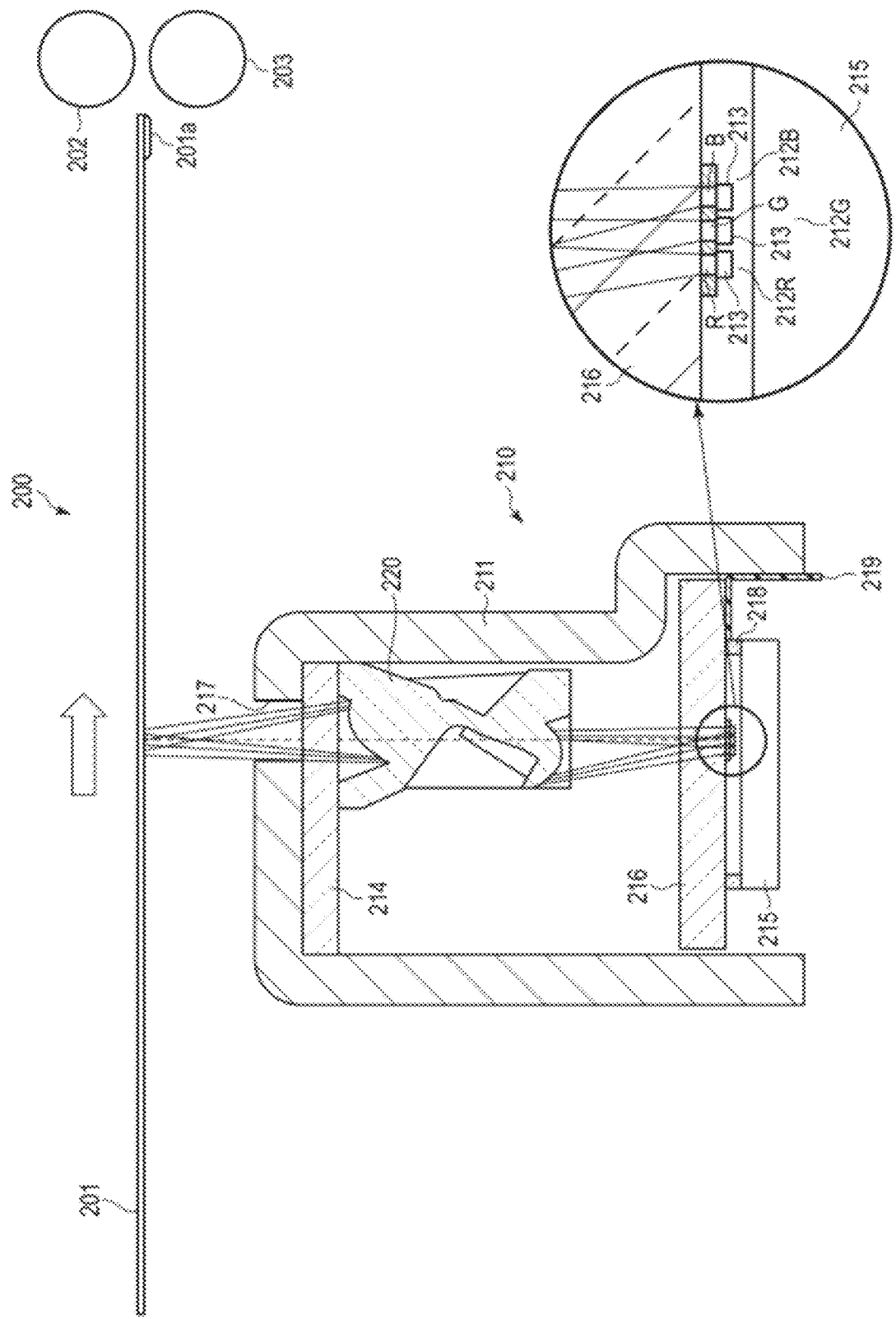
FIG. 5 is a schematic diagram illustrating main portions of a printer according to the embodiment.

FIG. 5 is a schematic diagram illustrating main portions of a printer 200 which is another embodiment of the image forming apparatus. The printer 200 is, for example, a printer incorporated in an instant camera, or an instant photo printer for developing an image captured by a digital camera or the like.

The printer 200 has a conveyance mechanism (not shown) for conveying a photosensitive medium 201 such as a silver salt photographic film in the direction indicated by the arrow in FIG. 5 (i.e., right direction in FIG. 5). The photosensitive medium 201 is conveyed in a horizontal posture by the conveyance mechanism. The photosensitive medium 201 is provided with a housing portion 201a for accommodating a developer on a front end side thereof in the conveyance direction. A pair of pressing rollers 202 and 203 for clamping and pressing the photosensitive medium 201 to break the housing portion 201a is provided on a conveyance path for conveying the photosensitive medium 201. The pair of pressing rollers 202 and 203 has a length exceeding a width of the photosensitive medium 201 in a direction orthogonal to the conveyance direction.

The photosensitive medium 201 is conveyed between the pair of pressing rollers 202 and 203. At least one of the pressing rollers 202 and 203 is energized in a direction to approach each other. Therefore, the photosensitive medium 201 is conveyed between the pair of pressing rollers 202 and 203 while being pressed by the pair of pressing rollers 202 and 203. As a result, the housing portion 201a of the photosensitive medium 201 is crushed and broken by the pair of pressing rollers 202 and 203. By further conveying the photosensitive medium 201, the developer covers the whole surface of the photosensitive medium 201.

Below the conveyance path on which the photosensitive medium 201 is conveyed as shown in FIG. 5, an exposure device 210 is arranged to face the conveyance path in a separated manner. The exposure device 210 irradiates a photosensitive surface of the photosensitive medium 201 conveyed via the conveyance path with exposure light in three colors (RGB) obtained by performing the color separation on the image data to form a color latent image on the photosensitive medium 201. The exposure device 210 is arranged on the upstream side of the pair of pressing rollers 202 and 203 along the conveyance path.

The exposure device 210 has a support body 211 extending in a width direction orthogonal to the conveyance direction of the photosensitive medium 201 (i.e., a direction orthogonal to a paper surface). The support body 211 supports a lens mirror array 220 having substantially the same structure as the above-described lens mirror array 20. The lens mirror array 220 extending in the width direction orthogonal to the paper surface reflects the light emitted from light sources 212R, 212G and 212B as described later to converge the light, and then emits the light towards a photosensitive surface of the photosensitive medium 201. The lens mirror array 220 is described in detail later.

The light sources 212R, 212G and 212B are, for example, OLEDs in which filters and apertures each arranged in staggered manner in two rows for respective colors with respect to white organic EL elements 213. The white organic EL element 213 is attached to a transparent glass 216. In the OLED, the transparent glass 216 and a sealing plate 215 are isolated from the air to prevent moisture absorption by an adhesion 218 in a frame shape applied between the transparent glass 216 and the sealing plate 215 and over the outer periphery of the sealing plate 215 to hermetically seal a space between the transparent glass 216 and the sealing plate 215. The white organic EL element 213 is connected to a flexible substrate 219, and electric power is supplied from a circuit on the flexible substrate 219. The support body 211 supports the transparent glass 216 between the lens mirror array 220 and the light sources 212R, 212G and 212B.

The support body 211 supports a transparent protective glass 214 on the photosensitive medium 201 side with respect to the lens mirror array 220. The protective glass 214 protects the lens mirror array 220 and prevents dust from adhering to the lens mirror array 220. The protective glass 214 is positioned by abutting against one end of the lens mirror array 220. The support body 211 has a slit 217 extending in the width direction on the light emitting side with respect to the protective glass 214. The slit 217 has a width at which a light component necessary for exposure can pass through and noise light unnecessary for exposure can be shielded by the edge of the slit 217.

When the photosensitive medium 201 is conveyed by a conveyance mechanism, and the photosensitive medium 201 is irradiated with the light from the light sources 212R, 212G and 212B via the lens mirror array 220, a color latent image is formed on the photosensitive medium 201. If the photosensitive medium 201 is further conveyed, the photosensitive medium 201 is pressed by the pair of pressing rollers 202 and 203, the housing portion 201a of the photosensitive medium 201 is broken, and the developer is supplied to the photosensitive medium 201. As a result, the color latent image on the photosensitive medium 201 is developed, and a color image is formed on the photosensitive medium 201.

Figure 6:
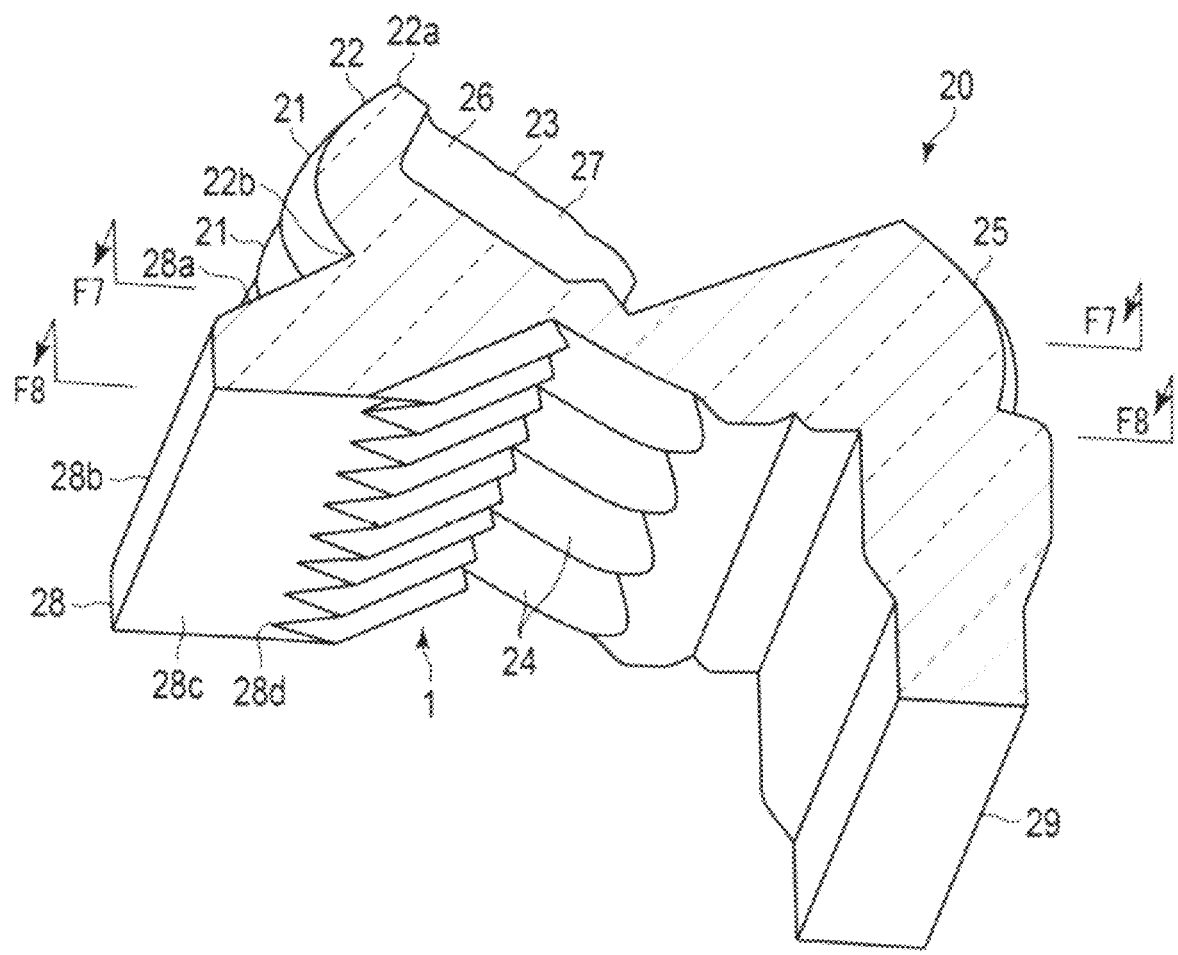
FIG. 6 is a perspective view partially illustrating an external appearance of the lens mirror array in FIG. 3 in an enlarged manner.
Figure 7:
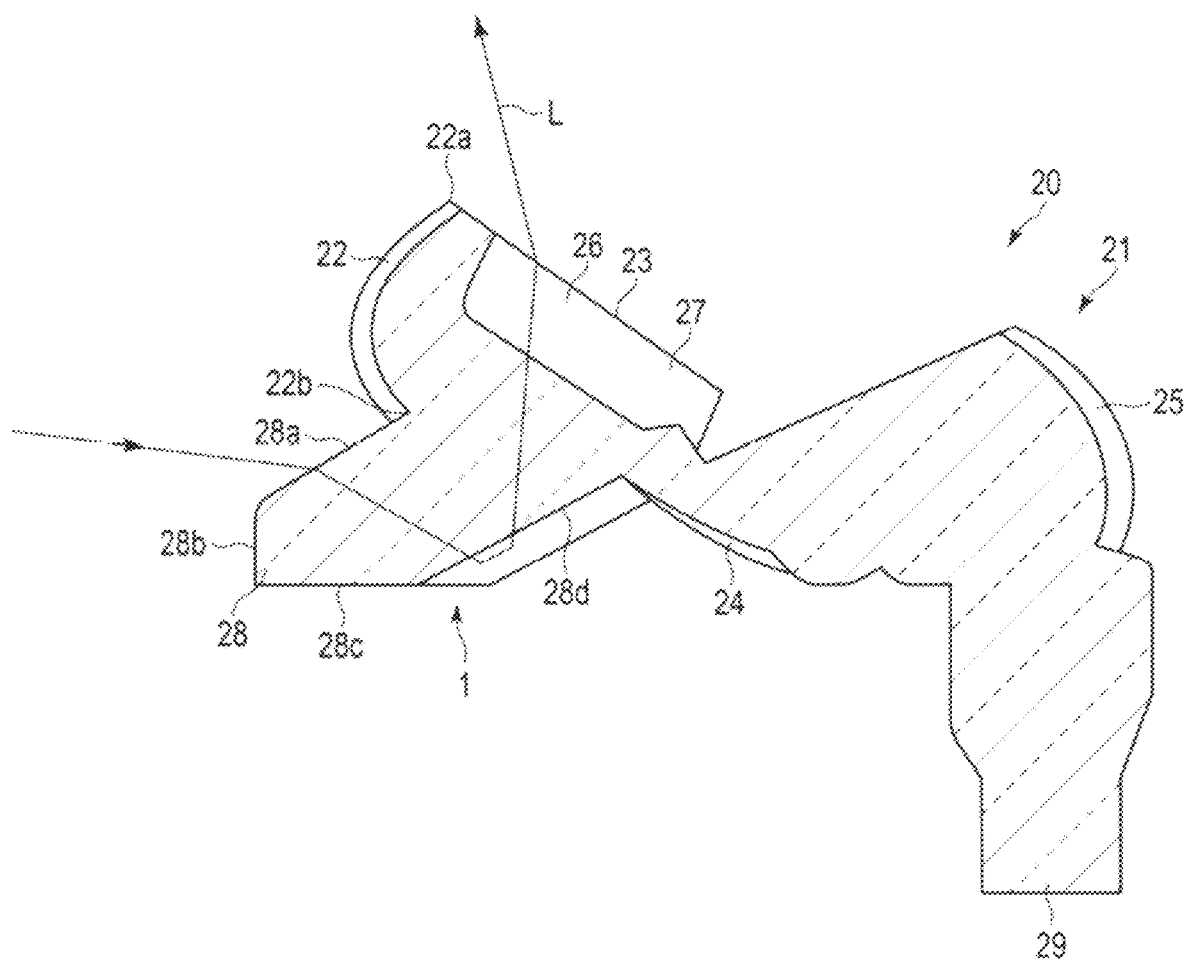
FIG. 7 is a cross-sectional view taken along a line F7-F7 of the lens mirror array in FIG. 6.
Figure 8:
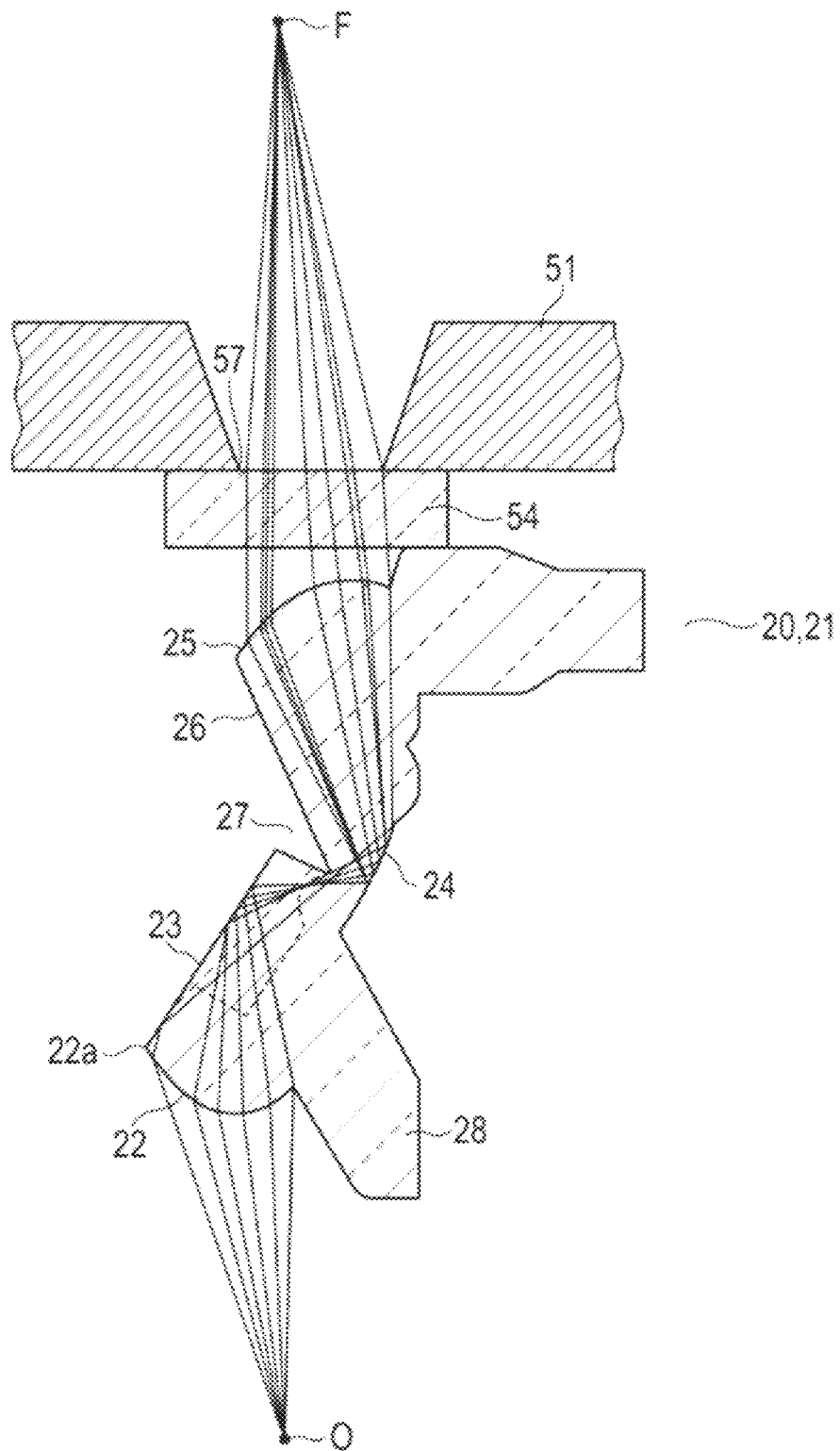
FIG. 8 is a cross-sectional view taken along a line F8-F8 of the lens mirror array in FIG. 6, illustrating an optical path of light passing through the lens mirror array in FIG. 7.

Below, the above-described lens mirror array 20 is described with reference to FIG. 3, FIG. 6, FIG. 7, and FIG. 8. FIG. 3 is a perspective view illustrating an external appearance of the lens mirror array 20, and FIG. 6 is a perspective view of a part of the lens mirror array 20 in an enlarged manner. FIG. 7 is a cross-sectional view of the lens mirror array 20 taken along a plane orthogonal to a longitudinal direction thereof between two adjacent optical elements 21. FIG. 8 is a sectional view of the lens mirror array 20 taken along a plane that passes through the center in the main scanning direction of one optical element 21 of the lens mirror array 20 and is orthogonal to the longitudinal direction of the lens mirror array 20, and is a sectional view for explaining an optical path of the light passing through the lens mirror array 20. Since the lens mirror array 220 according to the other embodiment described above has substantially the same structure as the lens mirror array 20 described here, the lens mirror array 20 is described here as a representative, and the description for the lens mirror array 220 is omitted.

The lens mirror array 20 is incorporated in each of the document reading device 10 and the exposure devices 50Y, 50M, 50C and 50K of the copy machine 100 extending in the longitudinal direction along the main scanning direction. The lens mirror array 20 has a structure in which a plurality of transparent optical elements 21 having substantially the same shape (only four are shown in FIG. 6) is integrally arranged side by side in the main scanning direction. In addition to the plurality of optical elements 21, the lens mirror array 20 further includes extended portions 20a for an operator to grip with his or her fingers at both ends in the longitudinal direction thereof. In the present embodiment, the lens mirror array 20 is made by a transparent resin through integral molding. The lens mirror array 20 may be made of glass.

As shown in FIG. 8, each optical element 21 of the lens mirror array 20 guides diffused light from an object point O to form an image at an imaging point F. The light from a plurality of object points O arranged side by side in the main scanning direction is incident on one optical element 21, and the one optical element 21 emits the light incident from the object points in a predetermined range. For example, one optical element 21 emits the light from an object point O arranged in a width two to three times of a pitch between the optical elements 21 in the main scanning direction. Each optical element 21 of the lens mirror array 20 reflects the incident light twice and then emits the light to form an erected image of the object point O at the imaging point F.

For example, when the lens mirror array 20 is incorporated in the document reading device 10 shown in FIG. 2, the plurality of optical elements 21 enables the light reflected from the document to form an image on a light receiving surface of the image sensor 15. When the lens mirror array 20 is incorporated in the exposure device 50K shown in FIG. 4, the plurality of optical elements 21 enables the light from the light source 53 to form an image on the surface of the photoconductive drum 31K. Below, the structure and function of each optical element 21 of the lens mirror array 20 incorporated in the exposure device 50K are described as an example.

As shown in FIG. 6 to FIG. 8, on the surface of the optical element 21, an incident-side lens surface 22, an upstream-side reflecting surface 23, a downstream-side reflecting surface 24, and an emitting-side lens surface 25 are provided. The incident-side lens surface 22, the downstream-side reflecting surface 24 and the emitting-side lens surface 25 are curved surfaces that are convex to the outside. The upstream-side reflecting surface 23 is a flat surface. Between the incident-side lens surface 22 and the upstream-side reflecting surface 23, a ridge 22a extending substantially along the longitudinal direction of the lens mirror array 20 is provided. An imaginary boundary plane (i.e., cross section in FIG. 7) between the two optical elements 21 adjacent in the longitudinal direction is substantially orthogonal to each of the above-mentioned surfaces 22, 23, 24 and 25.

Each of the surfaces 22, 23, 24 and 25 of the optical element 21 substantially extends along the longitudinal direction of the lens mirror array 20. In other words, in the lens mirror array 20 in which the plurality of optical elements 21 are integrally connected to each other in the longitudinal direction, the respective surfaces 22, 23, 24 and 25 of the optical element 21 are continuous surfaces connected to each other in the longitudinal direction, respectively. The lens mirror array 20 is attached in such a manner that the incident-side lens surface 22 of the plurality of optical elements 21 faces the light source 53.

As shown in FIG. 8, in a case of focusing on one optical element 21, diffused light from the light source 53 placed at the object point O is incident on the incident-side lens surface 22. The incident-side lens surface 22 converges the incident diffused light to form an intermediate inverted image. The upstream-side reflecting surface 23 connected to the incident-side lens surface 22 via the ridge 22a reflects the light incident through the incident-side lens surface 22 towards the downstream-side reflecting surface 24 by total reflection or Fresnel reflection.

The downstream-side reflecting surface 24 further reflects the light reflected by the upstream-side reflecting surface 23 towards the emitting-side lens surface 25 by total reflection or Fresnel reflection. The downstream-side reflecting surface 24 may be a flat surface. The emitting-side lens surface 25 emits the light reflected by the downstream-side reflecting surface 24 towards the surface of the photoconductive drum 31K arranged at the imaging point F. The emitting-side lens surface 25 is combined with the downstream-side reflecting surface 24 to form an erected image that is an inverted image of the intermediate inverted image formed by the incident-side lens surface 22. The light emitted from the emitting-side lens surface 25 is imaged on the surface of the photoconductive drum 31K arranged at the imaging point F.

A light shielding material 26 (refer to FIG. 6) is applied to the surface of the optical element 21. The light shielding material 26 is applied to the surface of the optical element by a dispenser, an inkjet head or the like. The light shielding material 26 is, for example, an ink (for example, UV ink containing a light shielding material such as carbon black, pigment or dye) with high light shielding property, which has a polymer having substantially the same refractive index as the lens mirror array 20 as a base material. The light shielding material 26 prevents the light transmitted to the lens mirror array 20 from being reflected and being emitted to the outside of the lens mirror array 20.

The upstream-side reflecting surfaces 23 of the plural optical elements 21 adjacent to each other in the longitudinal direction of the lens mirror array 20 are flush with the ends on the ridge 22a side close to the incident-side lens surface 22. In other words, between the upstream-side reflecting surfaces 23 of the plural optical elements 21, comb-like grooves 27 for dividing the reflecting surface are provided. The grooves 27 are formed to surround ends of the plural upstream-side reflecting surfaces 23 on a side separated from the incident-side lens surface 22 to define one end of the emitting-side lens surface 25. The groove 27 is provided around the upstream-side reflecting surface 23 excluding the ridge 22a.

Then, the light shielding material 26 is applied to the whole surface of the comb-like groove 27. The light shielding material 26 is injected into the groove 27 by a dispenser to be applied to an inner surface of the groove 27 by, for example, a capillary phenomenon, wet spreading or the like. In this manner, if the light shielding material 26 is applied to the inner surface of the groove 27 by the capillary phenomenon, the wet spreading or the like, an appropriate amount of the light shielding material 26 can be continuously and quickly applied, the application procedure can be simplified, and the light shielding material 26 can be uniformly applied to each optical element 21. In other words, in the present embodiment, the light shielding material 26 is not applied to the surface (particularly, the upstream-side reflecting surface 23) of the lens mirror array 20 other than the surface of the groove 27.

The lens mirror array 20 has two flanges 28 and 29 over the entire length thereof. Both ends of each of the flanges 28 and 29 in the longitudinal direction are included in the extended portion 20a described above. As shown in FIG. 6 and FIG. 7, the flange 28 on the incident side is provided between the incident-side lens surface 22 and the downstream-side reflecting surface 24 of each of the plurality of optical elements 21. The flange 28 on the incident side projects outwards from a portion between the plurality of incident-side lens surfaces 22 continuous in the longitudinal direction and the plurality of downstream-side reflecting surfaces 24 continuous in the longitudinal direction. The flange 29 on the emitting side is provided between the downstream-side reflecting surface 24 and the emitting-side lens surface 25 of each of the plurality of optical elements 21. The flange 29 on the emitting side protrudes outwards from a portion between the plurality of downstream-side reflecting surfaces 24 continuous in the longitudinal direction and the plurality of emitting-side lens surfaces 25 continuous in the longitudinal direction. The flanges 28 and 29 are necessary for positioning and attaching the lens mirror array 20.

For example, as shown in FIG. 4, when the lens mirror array 20 is incorporated in the exposure device 50K, the light from the light source 53 is incident on the incident-side lens surface 22 of the lens mirror array 20 via the slit 56 of the light shielding body 55. However, if the width of the slit 56 and a mounting position of the lens mirror array 20 are deviated from the designed values or have an error from the designed values, there is a possibility that a part of the light passing through the slit 56 is incident on the flange 28 on the incident side. The unnecessary light incident on the flange 28 in this way exits from the flange 28, and is then incident on the lens mirror array 20 again via the downstream-side reflecting surface 24, and is finally emitted as the noise light via the emitting-side lens surface 25.

Such noise light is emitted to the surface of the photoconductive drum 31K when the lens mirror array 20 is incorporated in the exposure device 50K and adversely affects the electrostatic latent image formed on the photoconductive drum 31K, resulting in deterioration in image quality. When the lens mirror array 20 is incorporated in the document reading device 10, if such noise light is incident on the image sensor 15, the image quality of the read image deteriorates. Therefore, in the present embodiment, in order to cut out such noise light, the prism structure 1 is provided on the surface of the flange 28 on the incident side. In the present embodiment, the prism structure 1 is provided on a fourth surface 28d of the flange 28.

The flange 28 on the incident side has first to fourth surfaces 28a, 28b, 28c and 28d. The first surface 28a is a flat surface extending in the main scanning direction and connected to an edge 22b opposite to the ridge 22a of the plurality of incident-side lens surfaces 22 continuous in the main scanning direction. The second surface 28b is a flat surface extending in the main scanning direction and connected to an edge of the first surface 28a on a side opposite to the incident-side lens surface 22 side. The third surface 28c is a flat surface extending in the main scanning direction and connected to the edge of the second surface 28b on a side opposite to the first surface 28a side. The fourth surface 28d is a surface extending in the main scanning direction and connected to the edge of the third surface 28c on a side opposite to the second surface 28b side. The edge of the fourth surface 28d on a side opposite to the third surface 28c side is connected to a plurality of downstream-side reflecting surfaces 24 continuous in the main scanning direction. The fourth surface 28d is substantially parallel to the first surface 28a.

The prism structure 1 provided on the fourth surface 28d of the flange 28 has a plurality of protrusions 1a extending in a direction orthogonal to the longitudinal direction of the flange 28. The plurality of protrusions 1a is adjacent to each other in the longitudinal direction of the lens mirror array 20. The plurality of protrusions 1a protrudes outwards from the fourth surface 28d to be integrally provided as a part of the lens mirror array 20. Each protrusion 1a is formed in such a manner that a cross section thereof taken along a plane orthogonal to the fourth surface 28d and parallel to the longitudinal direction thereof is a substantially right triangle shape. In other words, a vertex angle of each protrusion 1a is approximately 90 degrees. The number and size of the protrusion 1a may be arbitrarily changed.

For example, as shown by a light beam L in FIG. 7, the light from the light source 53 incident on the lens mirror array 20 via the first surface 28a of the flange 28 is refracted by the first surface 28a, and most of the light is reflected by the prism structure 1 provided on the fourth surface 28d of the portion 28. The prism structure 1 reflects the light that is going to exit from the flange 28 to the inside according to the retroreflection principle. Specifically, since each of the plurality of protrusions 1a of the prism structure 1 have two surfaces substantially orthogonal to each other across a top portion therebetween, for example, the light incident on the protrusion 1a from a direction orthogonal to the fourth surface 28a is reflected by one surface of the protrusion 1a and then is reflected by the other surface, and in this way, the light incident on the protrusion 1a is reflected in a direction substantially opposite to the incident direction when viewed from a ridge line direction of the prism. At this time, the reflection direction of the light when viewed from the longitudinal direction (the state in FIG. 7) is determined by an angle of the fourth surface 28a provided with the prism structure 1 with respect to the incident light. In other words, in the present embodiment, the prism structure 1 is provided on the fourth surface 28d inclined with respect to the incident direction of light to reflect the light incident on the flange 28 towards the upstream-side reflecting surface 23.

In FIG. 7, the light beam L incident through the first surface 28a of the flange 28 is illustrated; however, the light incident on the flange 28 via the second surface 28b and then incident on the prism structure 1 provided on the fourth surface 28d is also directed towards the upstream-side reflecting surface 23 while most of the incident light is reflected by the prism structure 1. Therefore, according to the present embodiment, it is possible to reflect most of the light incident on the flange 28 towards the upstream-side reflecting surface 23, and thus, the noise light emitted from the lens mirror array 20 via the emitting-side lens surface 25 can be reduced. According to the present embodiment, since the prism structure 1 is provided on the fourth surface 28d inclined with respect to the incident direction of the light, when viewed from the longitudinal direction (the state in FIG. 7), most of the noise light returning to the light source 53 side can be removed without reflecting the light incident on the flange 28 in the direction opposite to the incident direction.

For this reason, for example, when the lens mirror array 20 of the present embodiment is incorporated in the document reading device 10 of the copy machine 100 as shown in FIG. 2, it is possible to prevent the noise light emitted through the flange 28 from being incident on the image sensor 15, thereby preventing the image quality of the read image by the document reading device 10 from deteriorating. In this case, it is possible to prevent the noise light reflected by the prism structure 1 from emitting to the surface of the document, and no adverse effect is made on the read image of the document.

For example, when the lens mirror array 20 of the present embodiment is incorporated in the exposure devices 50Y, 50M, 50C and 50K as shown in FIG. 4, it is possible to prevent the noise light from emitting to the surfaces of the photoconductive drums 31Y, 31M, 31C and 31K, and it is possible to prevent adverse effect from being made on the electrostatic latent images formed on the photoconductive drums 31Y, 31M, 31C and 31K, thereby prevent the image quality from deteriorating. In this case, it is possible to prevent the noise light reflected by the prism structure 1 from returning to the light source 53 side, and it is possible to prevent noise light from being secondarily generated.

According to the present embodiment, since the light incident on the lens mirror array 20 via the flange 28 is reflected by the prism structure 1 towards the upstream-side reflecting surface 23, most of the noise light is easily blocked by the light shielding material 26. The noise light transmitted through the upstream-side reflecting surface 23 without being blocked by the light shielding material 26 is emitted to the inner surface of the support body 11 or the inner surface of the support body 51, and in this way, no adverse effect is made on the image.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the above-described embodiment, the prism structure 1 is provided on the fourth surface 28d of the flange 28. However, the prism structure 1 may be provided on any of the other surfaces 28a, 28b and 28c of the flange 28. In order to cut out the noise light most effectively, it is desirable to provide the prism structure 1 on the fourth surface of the flange 28. However, even if the prism structure 1 is provided on the other surfaces 28a, 28b and 28c, at least a part of the noise light incident on the flange 28 can be cut out.

Figure 9:
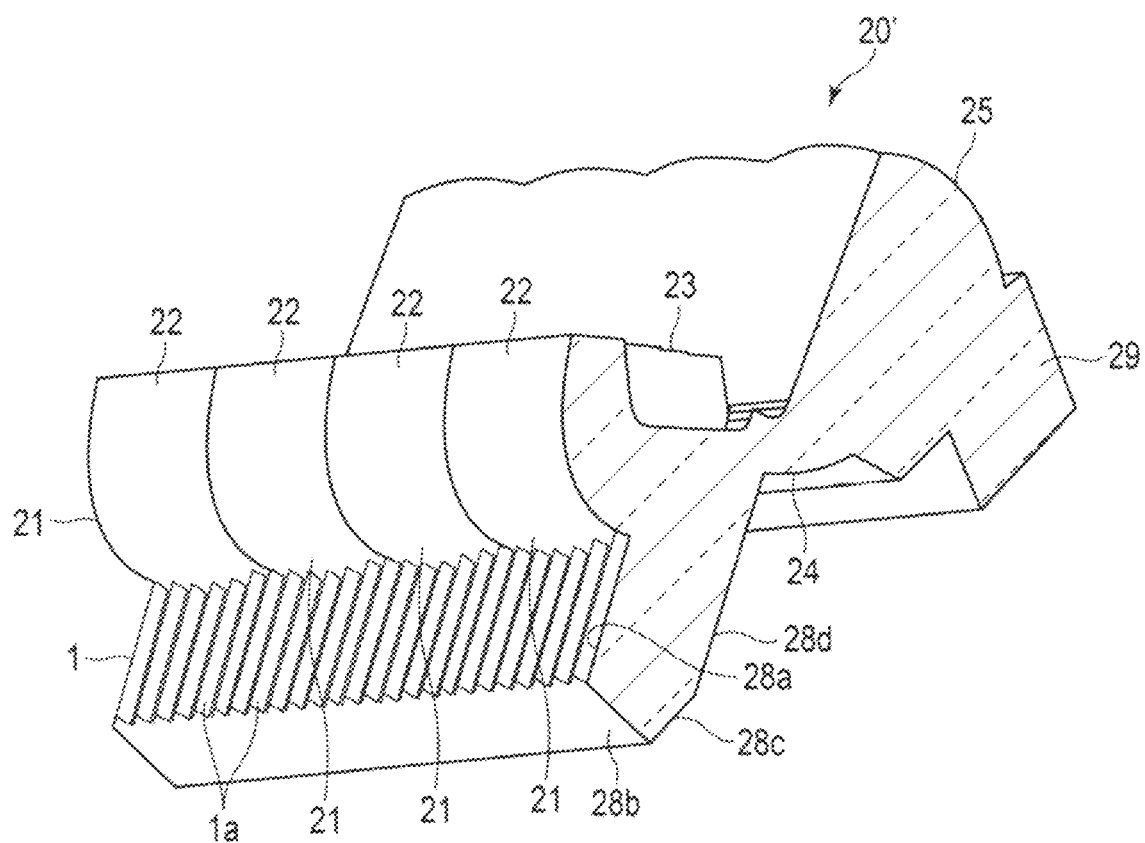
FIG. 9 is a perspective view partially illustrating a first modification of the lens mirror array in FIG. 6 in an enlarged manner.

FIG. 9 is a perspective view illustrating a part of a lens mirror array 20' in an enlarged manner according to a first modification in which the prism structure 1 is provided on the first surface 28a of the flange 28. As shown in FIG. 9, even when the prism structure 1 is provided on the first surface 28a of the flange 28, a part of the light incident on the flange 28 via the first surface 28a can be reflected by the prism structure 1, and the noise light can be reduced. Since the first surface 28a is inclined with respect to the incident direction of the light incident on the flange 28, the light is not reflected in a direction opposite to the incident direction.

Figure 10:
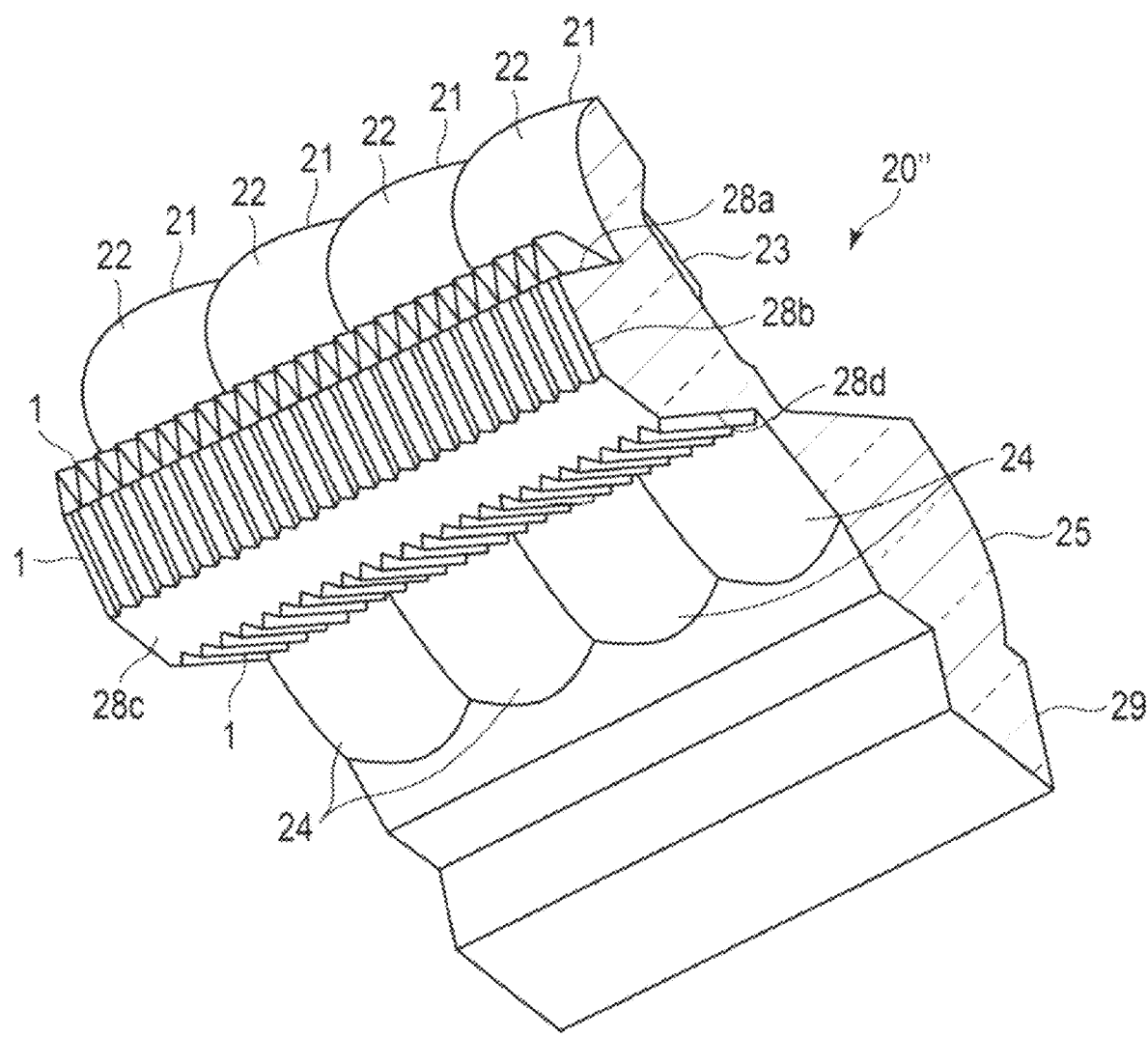
FIG. 10 is a perspective view partially illustrating a second modification of the lens mirror array in FIG. 6 in an enlarged manner.

FIG. 10 is a perspective view illustrating a part of a lens mirror array 20" in an enlarged manner according to a second modification in which the prism structures 1 are also provided on the first and second surfaces 28a and 28b in addition to the fourth surface 28d of the flange 28. As shown in FIG. 10, by providing the prism structures 1 on the first and second surfaces 28a and 28b in addition to the fourth surface 28d of the flange 28, it is possible to more reliably cut out the noise light as compared with a case in which the prism structures 1 are not provided on the first and second surfaces 28a and 28b.

In other words, it is more preferable to provide the prism structure 1 on the fourth surface 28d of the flange 28 and also provide the prism structures 1 on the other surfaces 28a, 28b and 28c. In this case, the noise light can be cut out more reliably as compared with a case in which the prism structure 1 is not provided on the other surfaces 28a, 28b and 28c.

When the prism structure 1 is provided on the surface through which the light transmitted through the flange 28 exits from the flange 28 to the outside (e.g., the third surface 28c and the fourth surface 28d), if a vertex angle of the protrusion 1a is about 90 degrees, it can be confirmed by simulation that the noise light can be satisfactorily cut out. When compared with a case in which the prism structure 1 is not provided on the fourth surface 28d, when the prism structure 1 is provided on the fourth surface 28d, it can be confirmed by simulation that about half of the noise light can be cut out.

On the other hand, when the prism structure 1 is provided on the surface through which the light is incident on the flange 28 (e.g., the first surface 28a and the second surface 28b), if the vertex angle of the protrusion 1a is set to an acute angle of about 60 degrees, it can be confirmed by simulation that the noise light can be satisfactorily cut out.

If the light shielding material is applied to the surface of the prism structure 1 in addition to the prism structure 1 described above, the noise light can be cut out more effectively. If the light shielding material is provided on the surface of the flange 28 provided with the prism structure 1, the capillary phenomenon acting on the groove between the plurality of protrusions 1a of the prism structure 1 can be utilized, and in this way, the light shielding material can be stably formed on the surface of the prism structure 1 uniformly. In this case, even if there is unevenness occurring in the light shielding material, since the noise light can be cut out by the prism structure 1, it is possible to cut out the noise light more reliably as compared with a case in which the light shielding material is applied to a flat surface. In this case, since there is no need to control a coating area of the light shielding material with high precision, a manufacturing cost of the apparatus can be reduced.

According to the present embodiment, there is no need to apply the light shielding material to the lens mirror array 20 in an application in which the noise light has little influence. In this case, instead of the light shielding material, the prism structure 1 is provided on the surface (for example, the fourth surface 28d) of the flange 28. As a result, the noise light can be appropriately cut out, and the lens mirror array 20 can be manufactured at low cost.

According to the present embodiment, by providing the prism structure 1 on the surface of the flange 28 of the lens mirror array 20, it is possible to reliably cut out the noise light even if an installation position precision of the lens mirror array 20 is low, or if a width of the slit for cutting out the noise light is deviated from the designated value. Therefore, by using the lens mirror array 20 of the present embodiment, there is no need to increase the installation position precision of the lens mirror array 20 and there is no need to form the width of the slit with high precision, thereby lowering the manufacturing cost of the apparatus. Depending on a specification of the device, it is also possible to omit the slit on the object point side.

What is claimed is:

1. A lens mirror array comprising:
  a plurality of optical elements connected to each other and aligned along one direction, wherein
  each of the optical elements comprises
    a first lens surface on which light is incident;
    a first reflection surface on which the incident light is reflected within the optical element;
    a second reflection surface on which the reflected light is further reflected within the optical element;
    a second lens surface through which the light reflected by the second reflection surface is emitted outside the optical element;
    a protruding portion having a plurality of surfaces and connected to the first lens surface and the second reflection surface; and
    a prism structure provided on one of the surfaces of the protruding portion, that is inclined with respect to a direction of light incident on the protruding portion and connected to the second reflection surface.

2. The lens mirror array according to claim 1, wherein the prism structure is provided on a surface of the protruding portion that reflects light passing through the protruding portion towards an inner side of the optical element.

3. The lens mirror array according to claim 1, wherein a vertex angle of a prism element of the prism structure is a right angle.

4. The lens mirror array according to claim 1, wherein the surface connected to the second reflection surface is substantially parallel to a surface of the protruding portion connected to the first lens surface.

5. The lens mirror array according to claim 4, wherein light reflected by the surface connected to the second reflection surface goes towards a direction of the first reflection surface.

6. The lens mirror array according to claim 1, wherein the prism structure is further provided on a surface of the protruding portion connected to the first lens surface.

7. The lens mirror array according to claim 1, wherein the prism structure is further provided on a first surface that is connected to the first lens surface, and a second surface that is connected to the first surface.

8. The lens mirror array according to claim 1, wherein a light shielding material is applied to a plurality of surfaces of the optical element.

9. The lens mirror array according to claim 1, further comprising:
  a comb-like groove between the first reflection surfaces of the adjacent optical elements.

10. An image forming apparatus comprising:
  a light source configured to emit light based on an image signal; and
  a lens mirror array recited in claim 1 and configured to guide light from the light source, wherein
  a photoconductive medium is irradiated with light based on the image signal which is guided by the lens mirror array to form an image thereon.

11. An image forming apparatus, comprising:
  an illuminating device configured to irradiate a document;
  a lens mirror array configured to guide light reflected by the document;
  an image sensor configured to receive the guided light to output an image signal; and
  an image forming unit configured to form an image based on the image signal output from the image sensor, wherein
  the lens mirror array further comprises a plurality of optical elements connected to each other and aligned along one direction, wherein each of the optical elements comprises
    a first lens surface on which light is incident;
    a first reflection surface on which the incident light is reflected within the optical element;
    a second reflection surface on which the reflected light is further reflected within the optical element;
    a second lens surface through which the light reflected by the second reflection surface is emitted outside the optical element;
    a protruding portion having a plurality of surfaces and connected to the first lens surface and the second reflection surface; and
    a prism structure provided on one of the surfaces of the protruding portion, that is inclined with respect to a direction of light incident on the protruding portion and connected to the second reflection surface.

12. The image forming apparatus according to claim 11, wherein
  the prism structure is provided on a surface of the protruding portion that reflects light passing through the protruding portion towards an inner side of the optical element.

13. The image forming apparatus according to claim 11, wherein
  a vertex angle of a prism element of the prism structure is a right angle.

14. The image forming apparatus according to claim 11, wherein the surface connected to the second reflection surface is substantially parallel to a surface of the protruding portion connected to the first lens surface.

15. The image forming apparatus according to claim 14, wherein
  light reflected by the surface connected to the second reflection surface goes towards a direction of the first reflection surface.

16. The image forming apparatus according to claim 11, wherein
  the prism structure is further provided on a surface of the protruding portion connected to the first lens surface.

17. The image forming apparatus according to claim 11, wherein the prism structure is further provided on a first surface that is connected to the first lens surface, and a second surface that is connected to the first surface.

18. An image forming apparatus comprising:
a light source configured to emit light based on an image signal;
a lens mirror array configured to guide light from the light source;
a photoconductor irradiated with light based on the image signal which is guided by the lens mirror array to form an electrostatic latent image thereon; and
a developing device configured to supply a developer to the electrostatic latent image on the photoconductor to develop the electrostatic latent image,
wherein
the lens mirror array further comprises
a plurality of optical elements connected to each other and aligned along one direction, each of the optical elements comprising a first lens surface on which light is incident;

a first reflection surface on which the incident light is reflected within the optical element;

a second reflection surface on which the reflected light is further reflected within the optical element;

a second lens surface through which the light reflected by the second reflection surface is emitted outside the optical element;

a protruding portion having a plurality of surfaces and connected to the first lens surface and the second reflection surface; and a prism structure provided on one of the surfaces of the protruding portion, that is inclined with respect to a direction of light incident on the protruding portion and connected to the second reflection surface.

* * * * *